Jan. 27, 1942.　　　E. A. SPERRY, JR　　　2,271,315
UNIVERSAL FLIGHT INDICATOR
Filed Dec. 3, 1938　　　3 Sheets-Sheet 1

INVENTOR
ELMER A. SPERRY JR.
BY
Joseph H. Lipschutz
ATTORNEY

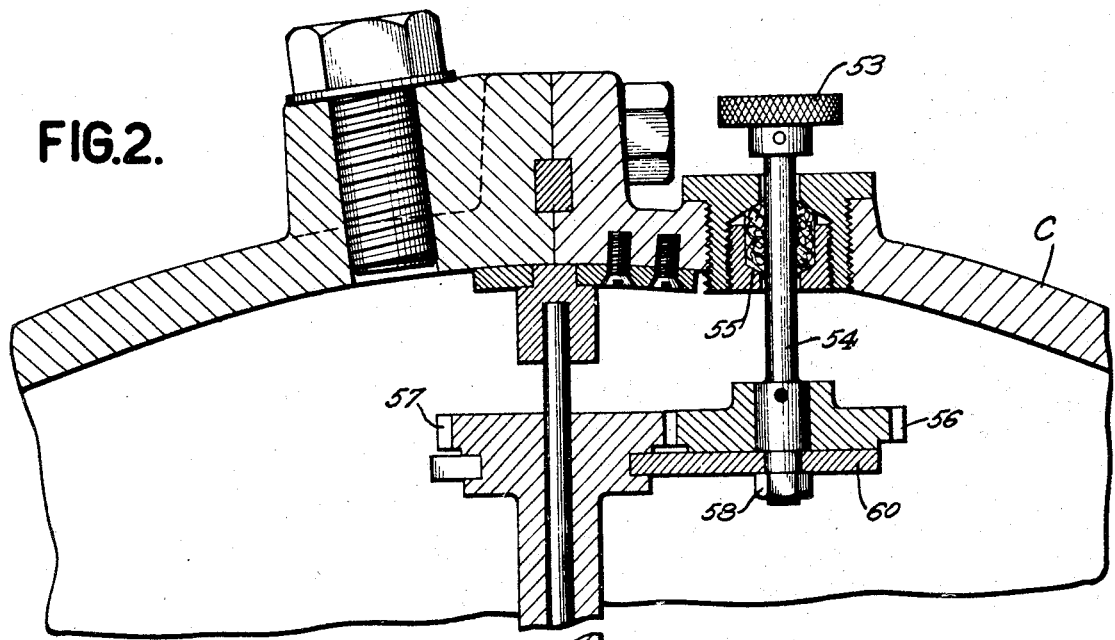
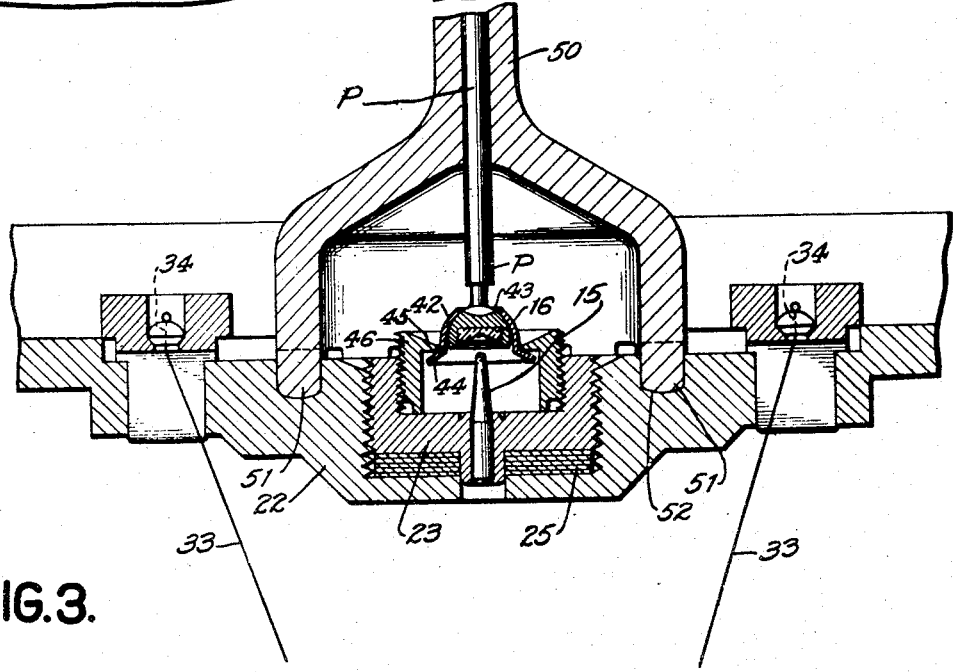
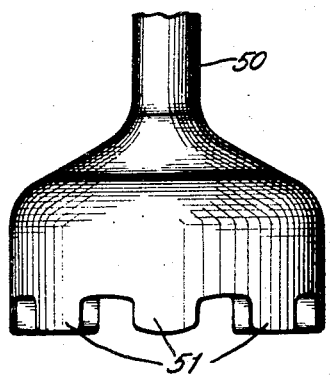

Jan. 27, 1942.  E. A. SPERRY, JR  2,271,315
UNIVERSAL FLIGHT INDICATOR
Filed Dec. 3, 1938  3 Sheets-Sheet 3

INVENTOR
ELMER A. SPERRY JR.
BY Joseph H. Lipschutz
ATTORNEY

Patented Jan. 27, 1942

2,271,315

UNITED STATES PATENT OFFICE 2,271,315

UNIVERSAL FLIGHT INDICATOR

Elmer A. Sperry, Jr., New York, N. Y., assignor to Sperry Products, Inc., Hoboken, N. J., a corporation of New York Application December 3, 1938, Serial No. 243,748

3 Claims. (Cl. 308—159)

This invention relates to universal flight instruments such as magnetic compasses and artificial horizons, particularly those types wherein a buoyant element is supported for universal movement around a fixed pivot. Such a device is disclosed, for example, in my copending application Ser. No. 140,650 filed May 4, 1937. In said application there is disclosed a universal flight instrument of the type described having a slow period sensitive element, but when such an instrument is mounted on vehicles such as aircraft, particularly military aircraft which is subjected to all kinds of severe maneuvers, the sensitive element tends to be displaced to such a degree that a long time interval must elapse after the craft reverts to a straight course before the sensitive element settles to give a useful indication. It is therefore desirable that the sensitive element be protected against such wide displacements during unusual movements of the craft. For this purpose, it is one of the principal objects of my invention to provide means whereby such a universally supported sensitive element in an instrument of the type described may be locked or caged in relatively fixed position with respect to the aircraft during such maneuvers.

As described in the said copending application, the sensitive element in such instruments, when supported upon a pivot, should, prior to the time that the pendulous element is attached thereto, be balanced with respect to the pivotal center of movement. This has heretofore been difficult with the types of pivots which have been employed, and it is therefore a further object of my invention to provide a pivot in an instrument of the type described wherein the sensitive element will at all times be balanced with respect to the pivotal center of movement regardless of the angular relationship existing between the sensitive element and the said center of pivotal movement.

It is a further object of my invention to provide in a device of the type described, improved means whereby a pivoted, sensitive element, freely supported upon said pivot by buoyancy or gravity, may be prevented from disengaging its point of pivotal support even though the pivot post moves through relatively wide angular distances with respect to the sensitive element.

Further objects and advantages of this invention will become apparent in the following detailed description thereof.

In the accompanying drawings,

Fig. 2 is a section showing a detail of the Fig. 1 mechanism in enlarged form.

Fig. 3 is an enlarged elevation of the lower portion of the caging device.

Figure 1:
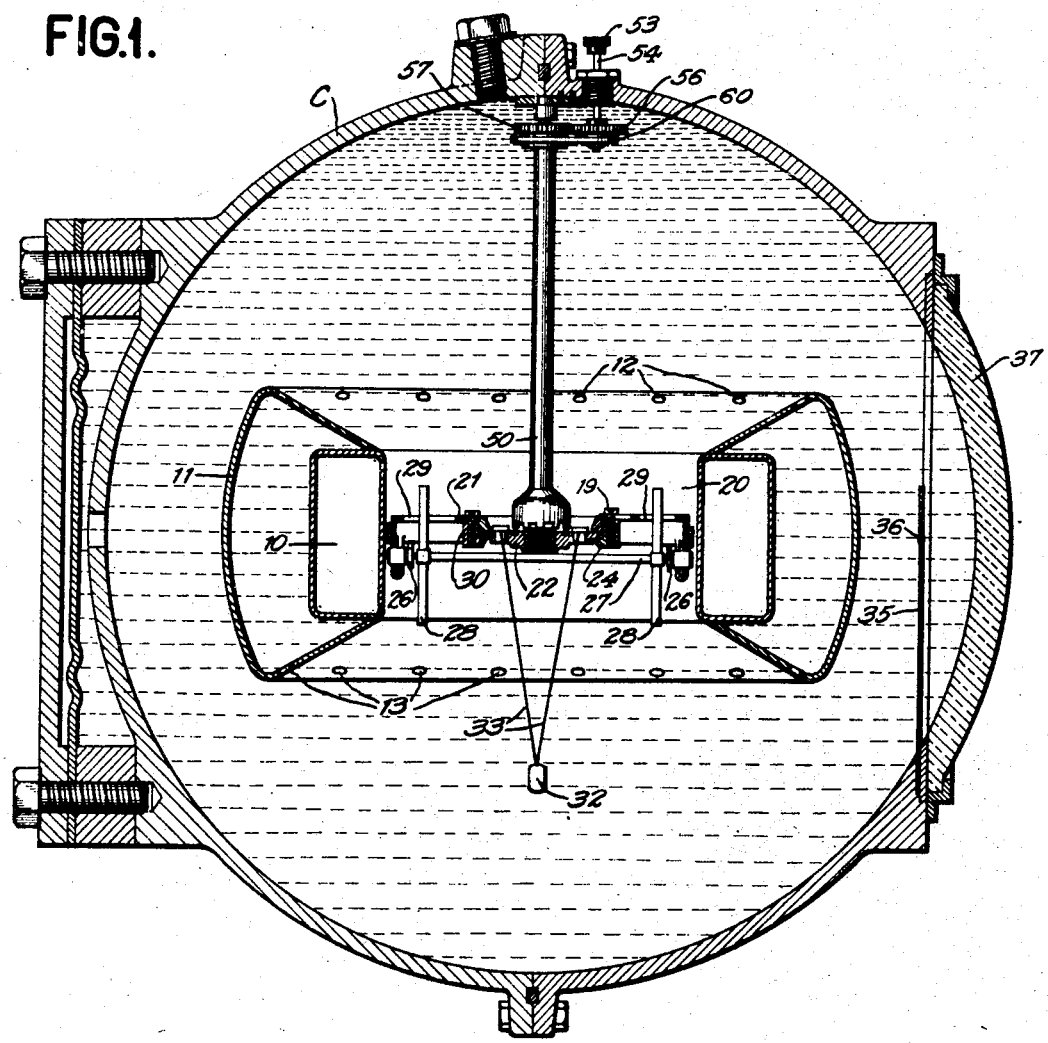
Fig. 1 is a vertical section through a form of universal flight instrument showing my invention applied thereto.

I have illustrated my invention in connection with a magnetic compass which may be of the general type described in my copending application Ser. No. 140,650, but the form of embodiment of the invention which is here described is merely illustrative and the principle thereof applies in general to all types of instruments embodying the essential elements of a universally pivoted inertia member which is held in engagement with its pivot by buoyancy or gravity. The magnetic compass shown consists essentially of three parts. First, an inertia element in the form of a magnetic meridian seeking element; second, a pendulous element; and, third, means for supporting the pendulous element on the magnetic element. The inertia or magnetic element consists of a magnet system and a float upon which the magnet system is supported. The float may be of the type disclosed in my copending application Ser. No. 183,550, filed January 5, 1938, which consists of an inner sealed circumferential float chamber 10 which provides the necessary buoyancy and is surrounded by an outer chamber 11 which is filled with liquid which enters through top and bottom ports 12 and 13. In this manner the float obtains the desirable quality of large inertia due to the fact that liquid is substantially trapped in the outer chamber 11 while a minimum of buoyancy is employed (the buoyancy of chamber 10 and the displacement of the float material) and therefore a minimum of buoyancy change obtained in response to variations in temperature. This is important because the float is supported by a pivot 15 resting against a jewel 16 in the bottom of a pivot post P which is fixed within liquid-filled casing C. As the float with its pivot 15 varies its buoyancy, it will vary the pressure which the float exerts against the jewel 16 of the pivot post P, and if the entire chamber 11 were buoyant there would be such a large variation in buoyancy in response to temperature change that the pivotal pressure between the pivot and pivot post would at times become so great as to prevent efficient operation of the instrument. By the construction shown here and described and claimed in my said copending application Ser. No. 183,550, I obtain the desirable qualities of large moment of inertia for the sensitive element, and hence lack of responsiveness to short-period disturbing forces with a minimum of buoyancy and therefore with a minimum of variation in buoyancy in response to temperature changes. The casing C is filled with fluid so that the outer chamber 11 of the float member will always be full of liquid which can enter and leave by openings 12 and 13 which are large enough to permit such movement of liquid in response to temperature changes but which substantially trap the liquid within the chamber 11 so that said liquid acts to increase the inertia of the float element. The float is formed with an inner cylindrical hollow chamber 20 within which is mounted the supporting flange 21 which supports a plate 22 carrying the pivot 15. The said pivot is fitted into a socket 23 which is in turn screwed into the supporting plate 22 and the height of the pivot point may be adjusted by means of shims 25 interposed between the bottom of socket 23 and the supporting plate 22. This adjustment is for the purpose of bringing the center of the pivot into predetermined relationship with the center of gravity and center of buoyancy of the sensitive element. For this purpose, also, a lateral adjustment of plate 22 on supporting plate 21 is provided, a lower flange 24 being provided so that plate 22 may move laterally between members 21 and 24 and may be locked in adjusted position by screws 19. This adjustment together with the vertical adjustment by means of shims 25 enables the center of gravity and center of buoyancy of the sensitive element thus far described to be brought into any desired relationship with the center of pivotal movement. Also supported in the said cylindrical interior 20 of the float are bearings 26 in which is journalled a shaft 27 carrying magnets 28 adjacent its opposite ends so that said magnets may be free to take up their natural angle of dip. The supporting flange 21 may be cut out as shown at 29 to provide spaces within which the magnets may operate.

The pendulous element may consist of a small weight 32 suspended by threads 33 from the plate 22 to which said strings are attached. The threads form a cone which is rigid within a few degrees of displacement, but when the acceleration forces exceed a predetermined degree, certain of the threads pivot around their point of attachment 34 while others of the threads become loose so that no further torque is applied to the sensitive element by the pendulous element. The outer surface of float chamber 11 may carry the necessary indicia which may be read in conjunction with vertical and horizontal lubber lines 35, 36 viewed through observation window 37.

Figure 4:
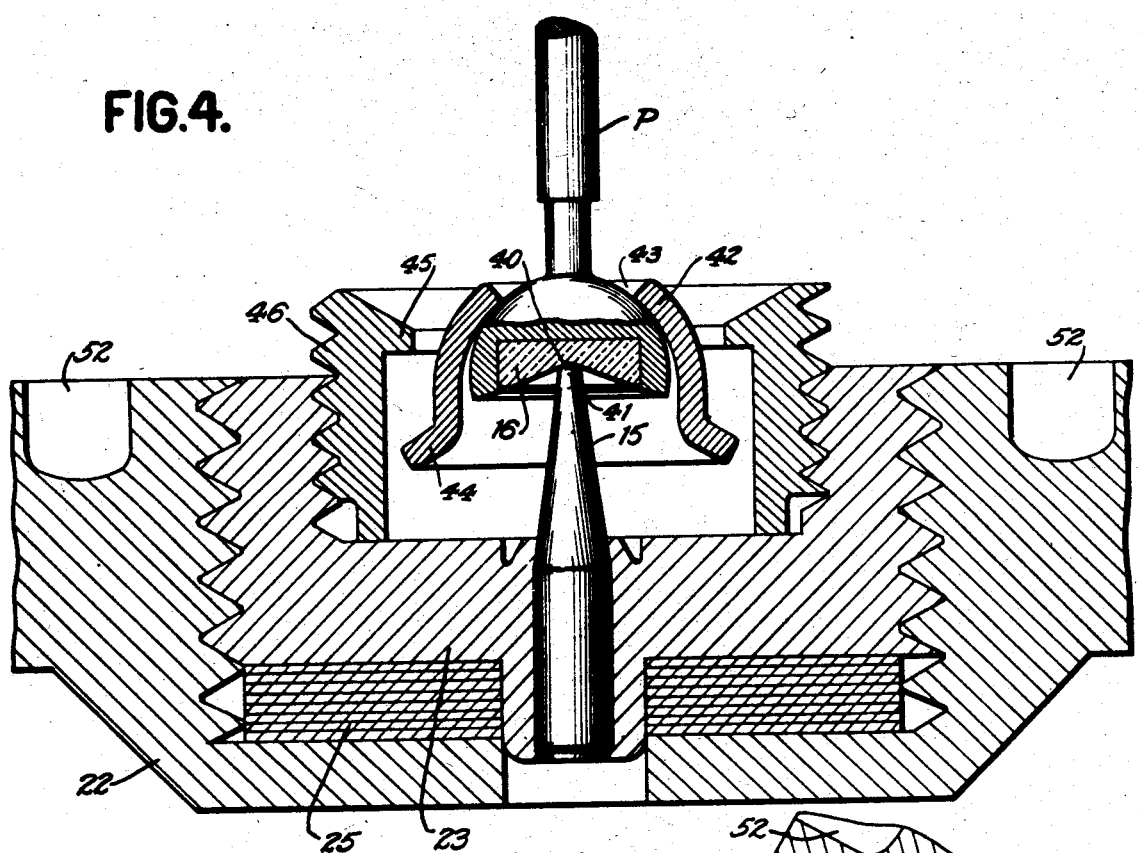
Fig. 4 is a vertical section through the novel pivot constituting my invention and disclosed in Fig. 1.
Figure 5:
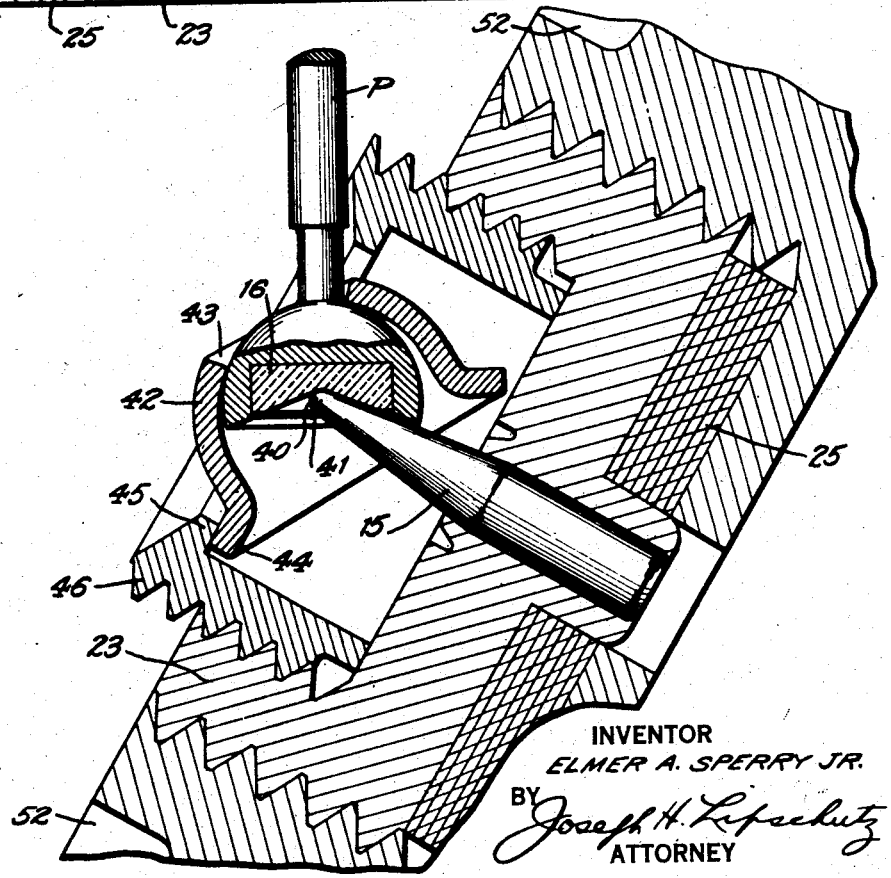
Fig. 5 is a view similar to Fig. 4 but showing a different angular relationship between the sensitive element and the pivot post.

Various forms of pivots have been utilized in magnetic compasses and similar instruments wherein a pivoted sensitive element is employed, but none of these has been found adequate for the purposes of an instrument such as I have just described. In such instrument the sensitive element is carefully balanced to maintain a predetermined relation with respect to the center of pivotal movement. In the present instance such predetermined relation consists in causing the center of gravity and center of buoyancy of the sensitive element prior to attaching the pendulous element thereto, to coincide with the center of pivotal movement. In order that this relationship shall be at all times maintained regardless of the angular relationship existing between the sensitive element and the pivot post P, I cause the head 40 (see Fig. 5) of the pivot 15 to be formed as nearly hemispherical as it is possible to construct the same, and I cause the center of gravity and the center of buoyancy of the sensitive element to coincide with respect to the center 41 of the hemispherical tip which is also the center of pivotal movement of the sensitive element. The faces of jewel 16 are tangential to the hemispherical center in which the head 40 of the pivot post normally rests (see Figs. 4 and 5). In this manner it will be seen that no matter what angular relationship exists between the sensitive element and the pivot post P, the center of gravity and center of buoyancy of the sensitive element will bear the same unchanging relation with respect to the center 41 of pivotal movement.

The faces of the jewel 16 are cut so as to allow a wide angle of movement of the pivot post P relative to the sensitive element, in the present instance this angle being shown as fully 60° to either side of the vertical. It will be understood that this makes a shallow cup out of the pivotal bearing and that there may be a tendency for the pivot post to leave the pivot cup in response to jars when the angular displacement becomes sufficiently large. In order to obviate such occurrence, I have shown in my prior and copending application Ser. No. 140,650, a retaining casing which encloses the two parts of the pivot, namely, the pivot point and the cup. In the present instance I have shown an improved retaining construction wherein only one movable member is employed in connection with one fixed member. The movable member 42 may take a substantially hemispherical form surrounding the pivot post P and have an opening 43 large enough to permit wide angle displacement. The said hemispherical movable member 42 is provided with an outwardly extending flange 44 adapted to engage an inwardly extending flange 45 on a socket member 46 threaded into the socket member 23. Thus it will be seen that the pivot 15 is prevented from escaping from the cup 16 by reason of the movable retaining member 42 which in turn is locked in position by the fixed retaining member 45.

As stated in the introduction, a construction of a universal flight instrument such as described has a long period sensitive element which, if displaced from its normal position to an appreciable degree, will take a long time to settle back into its proper indicating position. Thus, in military maneuvers where planes make very rapid movements, such as at times diving straight downwardly, looping the loop and barrel-rolling, it may be desirable to provide means for locking the parts of the instrument against such movements and thus avoid large displacements of the sensitive element requiring a long time for settling. For this purpose I have shown a caging device which may take the form of a sleeve 50 surrounding the pivot post P and slideable thereon, said sleeve 50 being provided with a plurality of prongs 51 at the lower end thereof, adapted to engage in corresponding sockets 52 in the supporting plate 22. The sleeve 50 for this purpose may be moved axially of the pivot post P by means of a knob 53 at the upper end of a post 54 extending through a packing 55 in casing C and having at its lower end a gear 56 meshing with the gear 57 on sleeve 50. The gear 56 is journaled in a plate 60 carried by the sleeve 50 and connected to the plate by means of a nut 58, so that as knob 53 is moved upwardly and downwardly, plate 60 and hence sleeve 50 will also be moved upwardly and downwardly. The sleeve 50 may be rotated until prongs 51 find their sockets 52 by rotating knob 53 to rotate gearing 56, 57 and hence sleeve 50. Thus, when an operator is about to make an unusual maneuver, he merely presses upon the knob 53 and rotates the same slightly until the prongs 51 engage in sockets 52 in plate 22 and moves the sensitive member and the pivot 15 away from the cup 16 in the bottom of pivot post P. When the maneuver is completed and ordinary flight is resumed, the knob 53 is pulled outwardly and the pivot 15 reengages in pivot cup 16. The sensitive element will not have been appreciably displaced and hence will be ready to indicate properly after a very brief interval.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a universal flight indicator comprising a casing filled with fluid, a buoyant sensitive element in said fluid including a pendulous member, said element having a pivot, a bearing carried by said casing, said pivot engaging said bearing to permit relative movement between said element and said bearing, the portion of said pivot which engages said bearing in any position of the element relative to said bearing having the form of a portion of a sphere and the portion of said bearing which said pivot engages also having the form of a portion of a sphere of substantially the same radius as said portion of said pivot whereby the center of movement of said element is the center of said spherical portion, the portions of said bearing adjacent the spherical portion thereof being substantially tangent to said spherical portion, said element, exclusive of said pendulous member, having the center of gravity and center of buoyancy thereof coincident with the center of movement.

2. In a universal flight indicator, a casing, a sensitive element, said casing and said sensitive element having cooperating members in the form of a bearing fixed to said casing and a pivot carried by said element and adapted to engage said bearing to permit relative movement between said element and said bearing, and means for preventing disengagement of said pivot from said bearing during wide angular relative movements, which consists of a two part retaining casing, one of said parts being supported on one of said relatively movable members and substantially enclosing said pivot and said bearing, and the other of said parts substantially enclosing said first part and being fixed with respect to the other of said relatively movable members, said second part being adapted to engage said first part after a predetermined relative angular movement between said members, and said first part having a lost motion connection to the respective member on which it is supported whereby said members may move through a further relative angular distance.

3. In a universal flight indicator, a casing, a sensitive element, said casing and said element having cooperating members in the form of a bearing fixed to said casing and a pivot carried by said element and adapted to engage said bearing to permit relative movement between said element and said bearing, and means for preventing disengagement of said pivot from said bearing during wide angular relative movements, which consists of a two-part retaining casing, one of said parts being movably supported on one of said relatively movable members and substantially enclosing said pivot and said bearing, the other of said parts substantially enclosing said first part and being fixed with respect to the other of said relatively movable members, said fixed part being adapted to engage said movable part after a predetermined relative angular movement of said members, the movable mounting of said movable part having means permitting said members to move through a further relative angular distance.

ELMER A. SPERRY, Jr.